United States Patent [19]

Araki et al.

[11] Patent Number: 5,206,092
[45] Date of Patent: Apr. 27, 1993

[54] ELECTRON BEAM-CURABLE COMPOSITION FOR RELEASE MATERIAL AND PROCESS FOR PREPARATION OF RELEASE MATERIAL

[75] Inventors: Takumi Araki; Hiroyuki Nagaishi; Shigeru Kurosawa, all of Oita, Japan

[73] Assignee: Showa Denko K.K., Tokyo, Japan

[21] Appl. No.: 314,863

[22] Filed: Feb. 24, 1989

[30] Foreign Application Priority Data

Feb. 24, 1988 [JP] Japan ................... 63-41450

[51] Int. Cl.$^5$ ............ B32B 9/04; C08F 2/46; C08J 3/28; C08K 5/24
[52] U.S. Cl. .................... 428/447; 522/153; 522/157; 522/158; 522/161; 524/261
[58] Field of Search ............... 522/77, 161, 157, 158, 522/184, 186, 189, 77, 161, 157, 158, 153; 524/261, 261; 428/447

[56] References Cited

U.S. PATENT DOCUMENTS

| 3,813,364 | 5/1974 | De Zuba et al. | 522/77 |
| 4,201,808 | 5/1980 | Cully et al. | 522/172 |
| 4,274,932 | 6/1981 | Williams et al. | 522/77 |
| 4,303,696 | 12/1981 | Brack | 522/172 |
| 4,401,781 | 8/1983 | Yoshifuji | 524/261 |
| 4,525,257 | 6/1985 | Kurtz et al. | 522/161 |
| 4,921,882 | 5/1990 | Senich | 522/184 |

FOREIGN PATENT DOCUMENTS

| 57-187221 | 11/1982 | Japan . |
| 62-85930 | 4/1987 | Japan . |
| 63-248834 | 10/1988 | Japan . |
| 63-249627 | 10/1988 | Japan . |

Primary Examiner—Marion E. McCamish
Assistant Examiner—Susan Berman
Attorney, Agent, or Firm—Sughrue, Mion, Zinn, Macpeak & Seas

[57] ABSTRACT

A release material of a good release property is prepared by shaping a resin composition comprising a thermoplastic polyolefin resin, a dimethylpolysiloxane and a functional compound, irradiating the shaped composition with electron beams, and if desired, heat-treating the shaped composition.

19 Claims, No Drawings

ELECTRON BEAM-CURABLE COMPOSITION FOR RELEASE MATERIAL AND PROCESS FOR PREPARATION OF RELEASE MATERIAL

BACKGROUND OF THE INVENTION (1) Field of the Invention

The present invention relates to an electron beam-curable composition for a release material and also to a process for preparing a release material from this composition.

The release material obtained from the composition of the present invention gives a release property, for example, to a base surface of a sticker or seal or to a back surface of a wound packaging tape.

(2) Description of the Related Art

In order to impart a release property to the surface of a release paper used as the base of an adhesive tape of a sticker or seal or to the back surface of a wound packaging adhesive tape, a method has been adopted in which an expensive reactive silicone is coated on the polyolefin-laminated base surface and a thermosetting treatment is carried out.

However, an apparatus having a length of scores of meters is necessary for the steps of coating the silicone and carrying out the heat treatment. Furthermore, since a solvent such as toluene is used at the step of coating the reactive silicone, large equipment cost and energy are necessary for recovering the solvent. As means for eliminating this disadvantage, a method may be considered in which the silicone is incorporated into a thermoplastic resin, whereby the large-scale step can be omitted. This method, however, has problems in that the release property required for the release paper is not manifested, and the silicone bleeding to the surface migrates to the adhesive layer of a sticker or seal to reduce the adhesive force of the adhesive layer.

As means for solving the above-mentioned problem, a method has been proposed in which a radiation-curable reactive organopolysiloxane is incorporated into a resin, the resulting composition is shaped by the lamination or inflation method and the shaped composition is irradiated with radioactive rays (see Japanese Unexamined Patent Publication No. 57-187221 and Japanese Unexamined Patent Publication No. 62-85930). According to this method, however, an expensive organosiloxane containing a mercapto group, a vinyl group and the like must be used, and if shaping is carried out at a high temperature, during the shaping step, the organopolysiloxane is reacted with a polyolefin type thermoplastic resin as the matrix or molecules of the organopolysiloxane are reacted with each other, with the result that the orgnaopolysiloxane is hardly caused to bleed to the surface of the shaped body and no substantial release property is manifested.

We previously developed a process for preparing a release material by incorporating a dimethylpolysiloxane in a polyolefin type thermoplastic resin, shaping the composition and irradiating the shaped composition with electron beams (see Japanese Unexamined Patent Publication No. 63-248834 and Japanese Unexamined Patent Publication No. 63-249627). However, this process has a problem in that the control of the release property is difficult and the long-period stability of the release property is not satisfactory.

SUMMARY OF THE INVENTION

Under this background, we made research with a view to developing a cheap release material without any complicated step while solving the problems of the conventional techniques. As the result, it was found if a composition comprising a chemically stable dimethylpolysiloxane which is difficult to cure when singly heated or irradiated with electron beams, a polyolefin type thermoplastic resin and a polyfunctional compound is shaped and the shaped composition is irradiated with electron beams, a stable release property can be manifested.

It is therefore a primary object of the present invention to provide a resin composition valuable for a release material having an excellent release property and does not degrade the adhesiveness of an adhesive, and a process for advantageously preparing this release material without using a large-scale apparatus.

More specifically, in accordance with one aspect of the present invention, there is provided an electron beam-curable resin composition for a release material, which comprises a thermoplastic polyolefin resin, a dimethylpolysiloxane and a polyfunctional compound.

In accordance with another aspect of the present invention, there is provided a process for the preparation of a release material, which comprises shaping a resin composition comprising a thermoplastic polyolefin resin, a dimethylpolysiloxane and a polyfunctional compound, irradiating the shaped composition with electron beams, and if desired, heat-treating the shaped composition.

At the shaping step of this process, the composition is generally shaped into a film of a laminated film with a paper layer or a layer of other material.

DESCRIPTION OF THE PREFERRED EMBODIMENTS

As the thermoplastic polyolefin resin used as the starting material of the composition of the present invention, there can be mentioned high-density polyethylene, medium-density polyethylene, low-density polyethylene, polypropylene, copolymers composed mainly of ethylene or propylene, ethylene/vinyl ester copolymers, ethylene/$\alpha,\beta$-unsaturated carboxylic acid ester copolymers, and blends thereof. Among them, low-density polyethylene, an ethylene copolymer, an ethylene/butene copolymer and polybutene are preferred. The most preferred thermoplastic polyolefin resin is a blend of low-density polyethylene and a mono-olefin copolymer. rubber.

The melt index (MI) or melt flow rate (MFR) of the thermoplastic polyolefin resin is 0.01 to 200 g/10 min, preferably 1 to 100 g/10 min, especially preferably 1 to 20 g/10 min.

In the blend of low-density polyethylene and the mono-olefin copolymer rubber, which is most preferably used in the present invention, as the low-density polyethylene, there can be used high-pressure low-density polyethylene having a density of 0.850 to 0.935 g/cm$^3$, linear low-density polyethylene or a blend thereof, which has MI of 0.01 to 200 g/10 min, preferably 0.1 to 100 g/10 min, more preferably 1 to 20 g/10 min.

As the mono-olefin copolymer rubber, there can be mentioned a rubber of a copolymer of at least two mono-olefins having 2 to 15 carbon atoms and a rubber of a copolymer of at least two mono-olefins having 2 to 15 carbon atoms and a polyene. For example, there can be mentioned an ethylene/propylene copolymer rubber and an ethylene/propylene/non-conjugated diene rubber. As the non-conjugated diene, there can be mentioned dicyclopentadiene, 1,4-hexadiene, dicyclooctadiene and ethylidene-norbornene. These mono-olefin copolymer rubbers can be used alone or in the form of a mixture of two or more thereof.

The Mooney viscosity $ML_{1+4}$ of the mono-olefin copolymer rubber at 100° C. is 5 to 300, preferably 20 to 250. If the Mooney viscosity at 100° C. is lower than 5, mixing is difficult, and if the Mooney viscosity at 100° C. is higher than 300, the flowability of the composition is poor.

The mixing ratio between the low-density polyethylene and the mono-olefin copolymer rubber is such that the content of the low-density polyethylene is 20 to 90% by weight, preferably 40 to 80% by weight, more preferably 50 to 70% by weight, and the content of the mono-olefin copolymer rubber is 80 to 10% by weight, preferably 60 to 20% by weight, more preferably 50 to 30% by weight. If the content of the low-density polyethylene is lower than 20% by weight and the content of the mono-olefin copolymer is higher than 80% by weight, the shapeability is degraded although a good release property is obtained. If the content of the low-density polyethylene is higher than 90% by weight and the content of the mono-olefin copolymer rubber is lower than 10% by weight, the stability of the release property is degraded.

The dimethylpolysiloxane to be incorporated in the thermoplastic polyolefin resin is a dimethylpolysiloxane having a terminal group —$SiR^1R^2R^3$ ($R^1$, $R^2$ and $R^3$ independently stand for a member selected from a methyl group, a hydroxyl group and an alkoxy group having 1 to 3 carbon atoms. Dimethylpolysiloxanes having both terminals blocked with a trimethylsilyl or hydroxydimethylsilyl group are especially preferred.

The kinetic viscosity (hereinafter referred to as "viscosity") at 25° C. of the dimethylpolysiloxane is 50 to $8 \times 10^6$ CS, preferably 500 to 60,000 CS. If the viscosity at 25° C. is lower than 50, mixing with the thermoplastic polyolefin resin is difficult and also the shaping is difficult, and a large irradiation dose is necessary for manifesting a satisfactory release property. Moreover, the mechanical strength of the thermoplastic polyolefin resin as the matrix is reduced and the cost increases. If the viscosity at 25° C. exceeds $8 \times 10^6$ CS, it is difficult to manifest a satisfactory release property.

The amount incorporated of the dimethylpolysiloxane is 0.1 to 30% by weight, preferably 1 to 15% by weight, more preferably 2 to 6% by weight, based on the resin composition. If the amount of the dimethylpolysiloxane is smaller than 0.1% by weight, no satisfactory release property can be obtained. If the amount of the dimethylpolysiloxane exceeds 30% by weight, the shaping becomes difficult and the cost increases.

A compound having a plurality of functional groups which readily cause reaction under irradiation with electron beams, such as vinyl groups (inclusive of allyl and acryloyl groups), methacryloyl groups and thiol groups (inclusive of mercapto groups) is used as the polyfunctional compound to be incorporated into the thermoplastic polyolefin resin together with the dimethylpolysiloxane.

As the compound having a plurality of vinyl groups, there can be mentioned divinylbenzene, and as the compound having a plurality of acryloyl groups, there can be mentioned polyethylene glycol diacrylate, trimethylolpropane triacrylate, tetramethylolmethane tetraacrylate, ethylene glycol diacrylate, diethylene glycol diacrylate, triethylene glycol diacrylate, neopentyl glycol diacrylate, 1,3-butylene glycol diacrylate, 1,6-hexanediol diacrylate, 1,4-butanediol diacrylate, pentaerythritol triacrylate, pentaerythritol tetraacrylate, dipentaerythritol (monohydroxy)pentaacrylate and dipentaerythritol hexaacrylate. As the compound having a plurality of methacryloyl groups, there can be mentioned polyethylene glycol dimethacrylate, trimethylolpropane trimethacrylate, tetramethylolmethane tetramethacrylate, ethylene glycol dimethylacrylate, diethylene glycol dimethacrylate, triethylene glycol dimethacrylate, neopentyl glycol dimethacrylate, 1,3-butylene glycol dimethacrylate, 1,6-hexanediol dimethacrylate, 1,4-butanediol dimethacrylate, pentaerythritol trimethacrylate, pentaerythritol tetramethacrylate, dipentaerythritol (monohydroxy)pentamethacrylate and dipentaerythritol hexamethacrylate. As the compound having a plurality of allyl groups, there can be mentioned diallyl terephthalate, diallyl adipate, triallyl cyanurate, triallyl isocyanurate, pentaerythritol triallyl ether, glyceryl diallyl ether, trimethylolpropane diallyl ether, diglycerol diallyl ether, diglycerol triallyl ether, allyl methacrylate, diallyl phthalate, diallyl maleate, diallyl isophthalate, triallyl trimellitate, tetraallyl pyromellitate, allyl glycol acrylate and allyl glycol methacrylate. As the compound having a plurality of thiol groups (mercapto groups), there can be mentioned trimethylolpropane tris-3-mercaptopropionate, 1,11-undecanedithiol, 4-ethylbenzene-1,3-dithiol, 1,8-octanedithiol, 1,18-octadecane dithiol, 4,8-dithioundecane-1,11-dithiol, dithiopentaerythritol, 1,2-dimercapto-1,3-butanediol, 2,6-dimethyloctane-2,6-dithiol, 2,4-dimethylbenzene-1,3-dithiol, 4,5-dimethylbenzene-1,3-dithiol, 1,10-decanedithiol, 1,12-dodecanedithiol, 2,5-toluenedithiol, 3,4-toluenedithiol, 1,6-hexanedithiol, 1,7-heptanedithiol, 1,4-benzenedithiol, 1,2-benzenedithiol, ethylene glycol dithioglycolate, 1,2,3-propanetrithiol, 1,2,4-butanetrithiol, trimethylolpropane trithioglycolate, pentaerythritol trithioglycolate, 1,3,5-benzenetrithiol, 2,4,6-mesitylenetrithiol, neopentane tetrathiol and pentaerythritol tetrakis(3-mercaptopropionate). Trimethylolpropane trimethacrylate, tetramethylolmethane tetramethacrylate, triallyl cyanurate and triallyl isocyanurate are preferred, and triallyl isocyanurate and trimethylolpropane triacrylate are especially preferred. These polyfunctional compounds may be used either alone or in combination.

The amount of the polyfunctional compound is 0.01 to 30% by weight, preferably 0.5 to 15% by weight, more preferably 1 to 5% by weight, based on the resin composition. If the amount of the polyfunctional compound is smaller than 0.01% by weight, a sufficient stability of the release property cannot be obtained. If the amount of the polyfunctional compound exceeds 30% by weight, the shaping is difficult and the cost increases.

An apparatus customarily used for mixing and kneading synthetic resins can be used for mixing the thermoplastic polyolefin resin with the dimethylpolysiloxane and the polyfunctional compound. For example, melt mixing can be accomplished by a Banbury mixer, a kneader, a twin-screw extruder, a single-screw extruder or a roll mill. Especially, where a dimethylpolysiloxane having a low viscosity is used, mixing is difficult by an ordinary method. In this case, a method is adopted in which mixing is carried out by feeding the dimethylpolysiloxane under pressure into an intermediate position of a cylinder of an extruder, or a method in which the dimethylpolysiloxane is added little by little by using a Banbury mixer.

The above-mentioned resin composition is ordinarily shaped into a film or a laminated film with a paper layer or a layer of other material.

For the shaping of the resin composition, an appropriate method is selected from an extrusion lamination method, an inflation method, a co-extrusion inflation method, a T-die method and a multi-ply T-die method according to the object and use.

The resin composition surface of the so-shaped film or laminated film is irradiated with electron beams, whereby a release surface is formed.

As the laminated film, a three-layer structure comprising a paper sheet, a polyolefin and the resin composition of the present invention is often used because this structure is suitable for use as a release sheet. As another examples of the laminated film, there can be mentioned a structure of polyamide, polycarbonate, polyolefin or polyvinyl chloride/polyolefin/resin composition of the present invention, and a structure of polyester/polyolefin/resin composition of the present invention. A known adhesive or adhesive resin can be used for lamination of these material according to need.

For the electron beam treatment, a method can be adopted in which electron beams are emitted from an electron beam irradiation apparatus of the Cockcroft type, Cockcroft-Walton type, Van de Graaff type, insulated core transformer type, linear type, dynamitron type, high frequency type or electron curtain type. The irradiation dose can be changed within a broad range according to the properties of the material to be irradiated. The irradiation dose is generally 1 to 30 Mrad, and preferably the irradiation dose is 1 to 15 Mrad, especially 3 to 10 Mrad. If the irradiation dose is smaller than 1 Mrad, no desired effect is obtained, and if the irradiation dose exceeds 30 Mrad, the mechanical properties of the matrix polymer are drastically degraded and the practical utility is lost. The acceleration voltage is not particularly critical, but from the practical viewpoint, preferably the acceleration voltage is 100 to 300 KV.

An inert gas is preferred as the irradiation atmosphere. As the inert gas, there can be mentioned, for example, nitrogen, carbon dioxide gas and helium.

The reason why irradiation with electron beams results in manifestation of a good release property has not been completely elucidated. However, it is believed that, when the thermoplastic polyolefin resin which is readily crosslinked or decomposed under irradiation with electron beams is exposed to electron beams in the presence of the dimethylpolysiloxane and polyfunctional compound, radicals formed in the thermoplastic polyolefin resin, radicals formed in the dimethylpolysiloxane and radicals formed in the polyfunctional compounds are delicately influenced by one another, and grafting reaction through the polyfunctional compound and crosslinking of molecules of the dimethylpolysiloxane are promoted, whereby a special performance is manifested.

If the resin composition which has been irradiated with electron beams is further heat-treated, the release property is further improved. The reason is considered to be that the reaction which has not been completed by irradiation with electron beams is further advanced by the heat treatment.

As the heat treatment method, there can be mentioned a method in which the irradiated film or laminated film is kept in the form of a roll in a circulation type or stationary oven, a method in which the irradiated film or laminated film is passed through such an oven, and a method in which the irradiated film or laminated film is passed through a hot roll. It is especially preferred that the irradiated film or laminated film be kept in a circulation type or stationary oven.

The heat treatment temperature is lower than the melting point of the thermoplastic polyolefin resin constituting the resin composition, and the heat treatment temperature is changed according to the kind of the resin, but especially preferably the heat treatment temperature is lower by at least 10° C. than the melting point of the thermoplastic polyolefin resin.

The heat treatment time is changed according to the amount incorporated of the silicone, the composition of the resin and the irradiation dose at the preceding step of irradiation with the electron beams, but the heat treatment time is mainly decided in view of the heat treatment temperature. Even if the heat treatment time is too long, no trouble is caused in connection with manifestation of the release property but in some resin, the mechanical characteristics are degraded. It is generally preferred that the heat treatment time be several seconds to 1 week, especially 10 seconds to 3 days.

Ordinary additives such as an antioxidant, a light stabilizer, a lubricant, an antiblocking agent, a pigment and a filler can be added to the resin composition of the present invention.

An antioxidant that prevents deterioration of the polyfunctional compound at the step of shaping the composition at a high temperature and does not hinder irradiation with electron beams should be selected. As specific examples, there can be mentioned 2,6-di-t-butyl-p-cresol, pentaerythrityl-tetrakis[3-(3,5-di-t-butyl-4-hydroxyphenyl)propionate], octadecyl-3-(3,5-di-t-butyl-4-hydroxyphenyl)propionate, 4,4'-thiobis(3-methyl-6-t-butylphenol), 1,3,5-tris(3,5-di-t-butyl-4-hydroxybenzyl)S-triazine, 2,4,6-(1H,3H,5H)trione, 1,3,5-trimethyl-2,4,6-tris-(3,5-di-t-butyl-4-hydroxybenzyl)-benzene, pentaerythritol tetrakis($\beta$-laurylthiopropionate), tetrakis(2,4-di-t-butylphenyl)-4,4-biphenylenediphosphite, calcium (3,5-di-t-butyl-4-hydroxybenzylmonoethylphosphonate), distearyl thiodipropionate and bis(2,4-di-t-butylphenyl)pentaerythritol. Among them, 2,6-di-t-butyl-p-cresol, octadecyl-3-(3,5-di-t-butyl-4-hydroxyphenyl)propionate and pentaerythrityltetrakis[3-(3,5-di-t-butyl-4-hydroxyphenyl)propionate] are preferred, and octadecyl-3-(3,5-di-t-butyl-4-hydroxyphenyl)propionate is especially preferred.

The release material obtained according to the process of the present invention has an excellent release property, and the release performance can be freely controlled by appropriately selecting the kinds and amounts of the resin component of the composition, the electron beam irradiation treatment conditions and the heat treatment conditions. Furthermore, the process of the present invention is advantageous over the conventional techniques in that a large-scale apparatus for the heat treatment or the recovery of the solvent need not be used.

The present invention will now be described in detail with reference to the following examples and comparative examples.

In the examples and comparative examples, with respect to each of samples prepared under various conditions, the peel strength and the residual adhesion ratio, and the stabilities of these properties, were determined.

The release strength and residual adhesiveness ratio were measured in the following manner. More specifically, a Pyron craft tape (supplied by Kyowa) was used as the standard tape and this tape was bonded to the composition-laminated surface of a release paper, and the 180° peel test was carried out according to JIS-Z-0237. Furthermore, the residual adhesion ratio was measured according to JIS-Z-1523. To examine the stabilities of the peel strength and residual adhesion ratio, the standard tape bonded to the composition-laminated surface was allowed to stand in this state for a certain period, and the peel strength and residual adhesion ratio were measured. Note, a higher residual adhesion ratio is preferred, and a smaller change of the peel strength or residual adhesion ratio with the lapse of time is preferred.

EXAMPLE 1

A release composition comprising high-pressure low-density polyethylene (Sholex supplied by Showa Denko; hereinafter referred to as "LD-A") having MI of 20 g/10 min and a density of 0.916 g/cm$^3$, 5% by weight (all of "%" given hereinafter are by weight) of a dimethylpolysiloxane (supplied by Shin-Etsu Chemical) having a viscosity of 60,000 CS at 25° C. and having both of the terminals blocked with a trimethylsilyl group and 2% of triallyl isocyanurate (hereinafter referred to as "TAIC") was melt-extruded and laminated at a resin temperature of 270° C. and a lamination thickness of 20 μm on the polyethylene surface of a polyethylene-laminated kraft paper, and the laminated composition was then subjected to an electron beam irradiation treatment in an atmosphere having an oxygen concentration lower than 10 ppm at a line speed of 30 m/min and an irradiation dose of 6 Mrad. The release material characteristics of the sample were measured.

EXAMPLE 2

A sample was prepared in the same manner as described in Example 1 except that a release composition comprising a mixture formed by melt-mixing high-density polyethylene (Sholex supplied by Showa Denko; hereinafter referred to as "HD") having MI of 22 g/10 min and a density of 0.960 g/cm$^3$ and high-pressure low-density polyethylene (LD-A) having MI of 20 g/10 min and a density of 0.916 g/cm$^3$ at an HD/LD-A weight ratio of 70/30, 2% of a dimethylpolysiloxane (supplied by Toray Silicone) having a viscosity of 500 CS at 25° C. and having both of the terminal groups blocked with a trimethylsilyl group, and 2% of TAIC was used, and the irradiation dose was changed to 10 Mrad. The release material characteristics of the sample were measured.

EXAMPLE 3

A sample was prepared in the same manner as described in Example 1 except that an ethylene/vinyl acetate copolymer (Sholex supplied by Showa Denko; hereinafter referred to as "EVA") having MI of 8 g/10 min and a vinyl acetate content of 9% was used as the thermoplastic polyolefin resin and the extrusion lamination was carried out at a resin temperature of 250° C. The release material characteristics of the sample were measured.

EXAMPLE 4

A three-layer laminate of paper/polyolefin mixture/release composition was shaped by co-extruding lamination. Namely, a release composition comprising polypropylene (Shoallomer supplied by Showa Denko; hereinafter referred to "PP") having MFR of 30 g/10 min, 4% of a dimethylpolysiloxane (supplied by Shin-Etsu Chemical) having a viscosity of 5,000 CS at 25° C. and having both of the terminals blocked with a trimethylsilyl group and 1% of trimethylolpropane triacrylate (hereinafter referred to as "TMPTA"), and a polyolefin mixture formed by melt-mixing PP having MFR of 30 g/10 min and high-pressure low-density polyethylene (LD-B) having MI of 2 g/10 min and a density of 0.925 g/cm$^3$ at a PP/LD-B weight ratio of 80/20, were co-extruded on a kraft paper at a polyolefin mixture temperature of 290° C. and a release composition temperature of 270° C., so that the lamination thickness of each of the polyolefin mixture and the release composition was 15 μm. The laminate was irradiated with electron beams at a line speed of 30 m/min and an irradiation dose of 3 Mrad in an atmosphere having an oxygen concentration lower than 10 ppm. The release material characteristics of the obtained samples were measured.

EXAMPLE 5

A sample was prepared in the same manner as described in Example 2 except that diallyl terephthalate (hereinafter referred to as "DATP") was used instead of TAIC, and the release material characteristics of the sample were measured.

EXAMPLE 6

A sample was prepared in the same manner as described in Example 1 except that 4% of a dimethylpolysiloxane having a viscosity of 5,000 CS at 25° C. was used instead of 5% of the dimethylpolysiloxane having a viscosity of 60,000 CS at 25° C. and 1% of TMPTA was used instead of 2% of TAIC, and the release material characteristics of the sample were measured.

Comparative Example 1

A sample was prepared in the same manner as described in Example 1 except that TAIC was not added, and the release material characteristics of the sample were measured.

Comparative Example 2

A sample was prepared in the same manner as described in Example 2 except that TAIC was not added, and the release material characteristics of the sample were measured.

COMPARATIVE EXAMPLE 3

A sample was prepared in the same manner as described in Example 3 except that TAIC was not added, and the release material characteristics of the sample were measured.

COMPARATIVE EXAMPLE 4

A sample was prepared in the same manner as described in Example 4 except that TMPTA was not added, and the release material characteristics of the sample were measured.

COMPARATIVE EXAMPLE 5

A sample was prepared in the same manner as described in Example 6 except that TMPTA was not added, and the release material characteristics of the sample were measured.

COMPARATIVE EXAMPLE 6

A sample was prepared in the same manner as described in Example 1 except that the irradiation with electron beams was not effected, and the release material characteristics of the sample were measured.

The measurement results obtained in Examples 1 through 6 and Comparative Examples 1 through 6 are collectively shown in Table 1.

TABLE 1

|  | No. | Initial stage | | After 1 week | | After 1 month | |
| --- | --- | --- | --- | --- | --- | --- | --- |
|  |  | Peel strength (g/20 mm) | Residual adhesion ratio (%) | Peel strength (g/20 mm) | Residual adhesion ratio (%) | Peel strength (g/20 mm) | Residual adhesion ratio (%) |
| Examples | 1 | 32 | 82 | 105 | 78 | 96 | 78 |
|  | 2 | 47 | 79 | 173 | 70 | 182 | 69 |
|  | 3 | 28 | 82 | 122 | 75 | 113 | 74 |
|  | 4 | 95 | 74 | 204 | 65 | 211 | 64 |
|  | 5 | 55 | 79 | 142 | 68 | 147 | 68 |
|  | 6 | 36 | 81 | 201 | 70 | 195 | 69 |
| Comparative Examples | 1 | 39 | 80 | 295 | 51 | 482 | 41 |
|  | 2 | 56 | 78 | 358 | 45 | 461 | 40 |
|  | 3 | 37 | 81 | 311 | 50 | 412 | 42 |
|  | 4 | 89 | 73 | 484 | 40 | 553 | 38 |
|  | 5 | 53 | 79 | 313 | 51 | 467 | 40 |
|  | 6 | 306 | 52 | 515 | 40 | 712 | 31 |

EXAMPLE 7

A release composition comprising high-pressure low-density polyethylene (LD-A) having MI of 20 g/10 min and a density of 0.916 g/cm$^3$, 5% of the same dimethylpolysiloxane as used in Example 1, which had a viscosity of 60,000 CS at 25° C., and 2% of TAIC was extrusion-laminated on a polyethylene-laminated kraft paper at a resin temperature of 270° C. and a lamination thickness of 20 μm, and the laminate was subjected to an electron beam irradiation treatment at a line speed of 30 m/min and an irradiation dose of 4 Mrad in an atmosphere having an oxygen concentration lower than 10 ppm. Then, the irradiated laminate was heat-treated in the form of a roll in a gear oven maintained at 80° C. for 3 days. The release material characteristics of the obtained sample were measured.

EXAMPLE 8

A sample was prepared in the same manner as described in Example 7 except that a release composition comprising a mixture formed by melt-mixing high-density polyethylene (HD) having MI of 22 g/10 min and a density of 0.960 g/cm$^3$ and high-pressure low-density polyethylene (LD-A) having MI of 20 g/10 min and a density of 0.916 g/cm$^3$ at a weight ratio of 70/30, 2% of the same dimethylpolysiloxane as used in Example 2, which had a viscosity of 500 CS at 25° C., and 2% of TAIC, was used and the electron beam irradiation was carried at an irradiation does of 6 Mrad. The release material characteristics of the sample were measured.

EXAMPLE 9

A sample was prepared in the same manner as described in Example 7 except that EVA having MI of 8 g/10 min and a vinyl acetate content of 9% was used as the thermoplastic polyolefin resin and the extrusion lamination was carried out at a resin temperature of 250° C. The release material characteristics of the sample were measured.

EXAMPLE 10

A release composition comprising polypropylene having MFR of 30 g/10 min, 4% of the same dimethylpolysiloxane as used in Example 4, which had a viscosity of 5,000 CS at 25° C., and 1% of TMPTA, and a polyolefin mixture comprising polypropylene having MFR of 30 g/10 min and high-pressure low-density polyethylene having MI of 2 g/10 min and a density of 0.918 g/cm$^3$ at a weight ratio of 80/20, were co-extruded and laminated on a kraft paper at a polyolefin mixture temperature of 290° C. and a release composition temperature of 270° C. so that the lamination thickness of each of the mixture and composition was 10 μm, whereby a three-layer laminate of paper polyolefin mixture release composition was shaped. Then, the laminate was irradiated with electron beams at a line speed of 30 m/min and an irradiation dose of 3 Mrad in an atmosphere having an oxygen concentration lower than 10 ppm. Then, the irradiated laminate was heat-treated in the form of a roll for 3 days in a gear oven maintained at 50° C. The release material characteristics of the obtained sample were measured.

EXAMPLE 11

A sample was prepared in the same manner as described in Example 8 except that DATP was used instead of TAIC, and the release material characteristics of the sample were measured.

EXAMPLE 12

A sample was prepared in the same manner as described in Example 7 except that 4% of a dimethylpolysiloxane having a viscosity of 5,000 CS at 25° C. was used and 1.0% of TMPTA was used instead of TAIC, and the release material characteristics of the sample were measured.

COMPARATIVE EXAMPLE 7

A sample was prepared in the same manner as described in Example 7 except that TAIC was not added, and the release material characteristics of the sample were measured.

COMPARATIVE EXAMPLE 8

A sample was prepared in the same manner as described in Example 7 except that the electron beam irradiation treatment was not carried out, and the release material characteristics of the sample were measured.

The results obtained in Examples 7 through 12 and Comparative Examples 7 and 8 are collectively shown in Table 2.

TABLE 2

|  | No. | Initial stage | | After 1 week | | After 1 month | |
|---|---|---|---|---|---|---|---|
|  |  | Peel strength (g/20 mm) | Residual adhesion ratio (%) | Peel strength (g/20 mm) | Residual adhesion ratio (%) | Peel strength (g/20 mm) | Residual adhesion ratio (%) |
| Examples | 7 | 24 | 84 | 85 | 79 | 80 | 79 |
|  | 8 | 42 | 80 | 152 | 72 | 156 | 72 |
|  | 9 | 25 | 83 | 103 | 78 | 98 | 77 |
|  | 10 | 52 | 78 | 195 | 66 | 182 | 66 |
|  | 11 | 45 | 80 | 107 | 77 | 110 | 77 |
|  | 12 | 28 | 83 | 142 | 72 | 147 | 72 |
| Comparative | 7 | 40 | 80 | 303 | 49 | 405 | 45 |
| Examples | 8 | 315 | 52 | 523 | 40 | 702 | 31 |

EXAMPLE 13

A release composition comprising a mixture formed by melt-mixing an ethylene/propylene/non-conjugated diene copolymer (hereinafter referred to as "EPDM-1") having an ethylene/propylene/ethylidene-norbornene weight ratio of 60/35/5 and a Mooney viscosity $ML_{1+4}$ of 100 and high-pressure low-density polyethylene (LD-C) having MI of 20 g/10 min and a density of 0.918 g/cm$^3$ at an EPDM-1/LD-C weight ratio of 40/60, 4% of the same dimethylpolysiloxane as used in Example 4, which had a viscosity of 5,000 CS at 25° C., and 2% of TAIC, was extrusion-laminated on the polyethylene surface of a polyethylene-laminated kraft paper at a resin temperature of 270° C. and a lamination thickness of 20 μm. The laminate was irradiated with electron beams at a line speed of 30 m/min and an irradiation dose of 6 Mrad in an atmosphere having an oxygen concentration lower than 10 ppm. The release material characteristics of the obtained sample were measured.

of 5 g/10 min and LD-C and EPDM-1 used in Example 13 at an LD-C/EP/EPDM-1 weight ratio of 60/30/10, 4% of the same dimethylpolysiloxane as used in Example 2, which had a viscosity of 500 CS at 25° C., and 2% of TAIC, was extrusion-laminated on the polyethylene surface of a polyethylene-laminated kraft paper at a resin temperature 270° C. and lamination thickness of 20 μm. The laminate was irradiated with electron beams at a line speed of 30 m/min and an irradiation dose of 6 Mrad in an atmosphere having an oxygen concentration lower than 10 ppm. The release material characteristics of the obtained sample were measured.

COMPARATIVE EXAMPLE 9

A sample was prepared in the same manner as described in Example 13 except that TAIC was not added. The release material characteristics of the sample were measured.

COMPARATIVE EXAMPLE 10

A sample was prepared in the same manner as described in Example 13 except that the electron beam irradiation treatment was not carried out. The release material characteristics of the obtained sample were measured.

The measurement results obtained in Examples 13 through 15 and Comparative Examples 9 and 10 are collectively shown in Table 3.

TABLE 3

|  | No. | Initial stage | | After 1 week | | After 1 month | |
|---|---|---|---|---|---|---|---|
|  |  | Peel strength (g/20 mm) | Residual adhesion ratio (%) | Peel strength (g/20 mm) | Residual adhesion ratio (%) | Peel strength (g/20 mm) | Residual adhesion ratio (%) |
| Examples | 13 | 50 | 80 | 56 | 80 | 59 | 80 |
|  | 14 | 80 | 77 | 85 | 76 | 86 | 76 |
|  | 15 | 55 | 80 | 60 | 79 | 60 | 79 |
| Comparative | 9 | 62 | 78 | 123 | 74 | 203 | 56 |
| Examples | 10 | 235 | 65 | 351 | 51 | 402 | 44 |

EXAMPLE 14

A sample was prepared in the same manner as described in Example 13 except that DATP was used instead of TAIC, and the release material characteristics of the sample were measured.

EXAMPLE 15

A release composition comprising a mixture formed by melt-mixing an ethylene/propylene copolymer rubber (EP) having a propylene content of 35% and MFR

EXAMPLE 16

A release composition comprising a mixture formed by melt-mixing an ethylene/propylene/non-conjugated diene copolymer rubber (EPDM-1) having an ethylene/propylene/ethylidene-norbornene weight ratio of 60/35/5 and a Mooney viscosity $ML_{1+4}$ of 100 and high-pressure low-density polyethylene (LD-C) having MI of 20 g/10 min and a density of 0.918 g/cm$^3$ at an EPDM-1/LD-C weight ratio of 40/60, 4% of the same dimethylpolysiloxane as used in Example 4, which had a viscosity of 5,000 CS at 25° C., and 2% of TAIC was extrusion laminated on the polyethylene surface of a polyethylene-laminated kraft paper at a resin temperature of 270° C. and a lamination thickness of 20 μm. The laminate was irradiated with electron beams at a line speed of 30 m/min and an irradiation dose of 4 Mrad in an atmosphere having an oxygen concentration lower than 10 ppm. The irradiated laminate was heat-treated in the form of a roll for 3 days in a gear oven maintained at 50° C. The release material characteristics of the obtained sample were measured.

EXAMPLE 17

A sample was prepared in the same manner as described in Example 16 except that DATP was used instead of TAIC, and the release material characteristics of the sample were measured.

EXAMPLE 18

A release composition comprising a mixture formed by melt-mixing an ethylene/propylene copolymer rubber (EP) having a propylene content of 35% and MFR of 5 g/10 min and the same LD-C and EPDM-1 as used in Example 16 at an LD-C/EP/EPDM-1 weight ratio of 60/35/10, 4% of the same dimethylpolysiloxane (supplied by Toray Silicone) as used in Example 2, which had a viscosity of 500 CS at 25° C., and 2% of TAIC was extruded and laminated on the polyethylene surface of a polyethylene-laminated kraft paper at a resin temperature of 270° C. and a lamination thickness of 20 μm. The laminate was irradiated with electron beams at a line speed of 30 m/min and an irradiation dose of 4 Mrad in an atmosphere having an oxygen concentration lower than 10 ppm. The irradiated laminate was heat-treated in the form of a roll for 3 days in a gear oven maintained at a temperature of 50° C. The release material characteristics of the obtained sample were measured.

COMPARATIVE EXAMPLE 11

A sample was prepared in the same manner as described in Example 16 except that TAIC was not added. The release material characteristics of the sample were measured.

COMPARATIVE EXAMPLE 12

A sample was prepared in the same manner as described in Example 16 except that the electron beam treatment was not carried out, and the release material characteristics of the sample were measured.

The measurement results obtained in Examples 16 through 18 and Comparative Examples 11 and 12 are collectively shown in Table 4.

blocked with a trimethylsilyl group, 2% of TAIC and 0.1% of octadecyl-3-(3,5-di-t-butyl-4-hydroxyphenyl)-propionate, which was maintained at 270° C., and high-pressure low-density polyethylene having MI of 11 g/10 min and a density of 0.917 g/cm$^3$, which was maintained at 290° C., were co-extruded and laminated on a kraft paper so that the lamination thickness of each of the composition and low-density polyethylene was 15 μm, whereby a three-layer laminate of paper/low-density polyethylene release composition was obtained. Then, the laminate was irradiated with electron beams at a line speed of 30 m/min and an irradiation dose of 10 Mrad in an atmosphere having an oxygen concentration lower than 10 ppm. The irradiated laminate was heat-treated at 180° C. for three days. The release material characteristics of the obtained sample were measured.

EXAMPLE 20

A sample was prepared in the same manner as described in Example 1 except that a composition comprising a mixture formed by melt-mixing linear low-density polyethylene (Sholex supplied by Showa Denko; hereinafter referred to as "LLD-A") having MI of 6 g/10 min and a density of 0.916 g/cm$^3$ and containing butene as a comonomer and high-pressure low-density polyethylene (Sholex supplied by Showa Denko; hereinafter referred to as "LD-C") having MI of 12 g/10 min and a density of 0.916 g/cm$^3$ at an LLD-A/LD-C weight ratio of 70/30, 5% of a dimethylpolysiloxane having a viscosity of 5,000 CS at 25° C. and having both of the terminal groups blocked with a trimethylsilyl group and 2% of TAIC, was used, and the irradiation dose was changed to 10 Mrad. The release material characteristics of the sample were measured.

EXAMPLE 21

A sample was prepared in the same manner as described in Example 1 except that 1% of a dimethylpolysiloxane having a viscosity of 500 CS at 25° C. and having both of the terminals blocked with a trimethylsilyl group was used. The release material characteristics of the sample were measured.

EXAMPLE 22

A sample was prepared in the same manner as described in Example 1 except that 8% of a dimethylpolysiloxane having a viscosity of 500 CS at 25° C. and having both of the terminals blocked with a trimethylsilyl group was used, and the release material characteristics of the sample were measured.

TABLE 4

| | | Initial stage | | After 1 week | | After 1 month | |
| --- | --- | --- | --- | --- | --- | --- | --- |
| | No. | Peel strength (g/20 mm) | Residual adhesion ratio (%) | Peel strength (g/20 mm) | Residual adhesion ratio (%) | Peel strength (g/20 mm) | Residual adhesion ratio (%) |
| Examples | 16 | 31 | 83 | 30 | 83 | 32 | 83 |
| | 17 | 82 | 77 | 85 | 76 | 86 | 76 |
| | 18 | 20 | 86 | 21 | 86 | 20 | 86 |
| Comparative | 11 | 65 | 75 | 125 | 74 | 235 | 54 |
| Examples | 12 | 235 | 65 | 351 | 51 | 402 | 44 |

EXAMPLE 19

A release composition comprising high-pressure low-density polyethylene (Sholex supplied by Showa Denko) having MI of 12 g/10 min and a density of 0.916 g/cm$^3$, 4% of a dimethylpolysiloxane having a viscosity of 500 CS at 25° C. and having both of the terminals

EXAMPLE 23

A sample was prepared in the same manner as described in Example 1 except that the amount of TAIC used was changed to 0.5%, and the release material characteristics of the sample were measured.

EXAMPLE 24

A sample was prepared in the same manner as described in Example 1 except that the amount of TAIC used was changed to 6%, and the release material characteristics of the sample were measured.

EXAMPLE 25

A sample was prepared in the same manner as described in Example 1 except that the irradiation dose was changed to 0.5 Mrad, and the release material characteristics of the sample were measured.

EXAMPLE 26

A sample was prepared in the same manner as described in Example 1 except that 4% of a dimethylpolysiloxane having a viscosity of 20 CS at 25° C. and having both of the terminals blocked with a trimethylsilyl group was used. Since the mixing and shaping were very difficult, a good portion of the sample was selected and subjected to the measurement of the release material characteristics.

EXAMPLE 27

A sample was prepared in the same manner as described in Example 26 except that the irradiation dose was changed to 20 Mrad, and the release material characteristics of the sample were measured.

EXAMPLE 28

A sample was prepared in the same manner as described in Example 1 except that 4% of a dimethylpolysiloxane having a viscosity of $12 \times 10^6$ CS at 25° C. and having both of the terminals blocked with a trimethylsilyl group was used, and the release material characteristics of the sample were measured.

COMPARATIVE EXAMPLE 13

A sample was prepared in the same manner as described in Example 1 except that 4% of pentaphenyltrimethyltrisiloxane having a viscosity of 175 CS at 25° C. was used as the siloxane, and the release material characteristics of the sample were measured.

The measurement results obtained in Examples 19 through 28 and Comparative Example 13 are collectively shown in Table 5.

We claim:

1. A process for the preparation of a release material comprising a substrate and a film laminated onto the substrate, which comprises melt-extruding a composition onto said substrate to form the film laminated onto the substrate, said composition comprising a thermoplastic polyolefin resin, a dimethylsiloxane and a polyfunctional compound having at least two vinyl groups, at least two methacryloyl groups or at least two thiol groups, and irradiating the laminated film with electron beams.

2. The process according to claim 1, wherein the irradiated laminated film is heat-treated at a temperature lower than the melting point of the thermoplastic polyolefin resin.

3. The process according to claim 1, wherein the thermoplastic polyolefin resin is a mixture of low-density polyethylene and a rubber of a mono-olefin copolymer.

4. The process according to claim 1, wherein the viscosity of the dimethylpolysiloxane is 50 to $8 \times 10^6$ CS as measured at 25° C. and the amount of the dimethylpolysiloxane is 0.01 to 30% by weight based on the composition.

5. The process according to claim 1, wherein the amount of the polyfunctional compound is 0.01 to 30% by weight based on the composition.

6. The process according to claim 1, wherein the irradiation dose of electron beams is 1 to 30 Mrad.

7. The process according to claim 1, wherein the polyfunctional compound has at least two vinyl groups.

8. The process according to claim 7, wherein said polyfunctional compound is divinylbenzene.

9. The process according to claim 7, wherein the at least two vinyl groups are acryloyl groups.

10. The process according to claim 9, wherein the polyfunctional compound having at least two acryloyl groups is selected from the group consisting of polyethylene glycol diacrylate, trimethylolpropane triacrylate, tetramethylolmethane tetraacrylate, ethylene glycol diacrylate, diethylene glycol diacrylate, triethylene glycol diacrylate, neopentyl glycol diacrylate, 1,3-butylene glycol diacrylate, 1,6-hexanediol diacrylate, 1,4-butanediol diacrylate, pentaerythritol triacrylate, pentaerythritol tetraacrylate, dipentaerythritol (monohydroxy)pentaacrylate and dipentaerythritol hexaacrylate.

11. The process according to claim 7, wherein the at least two vinyl groups are allyl groups.

12. The process according to claim 11, wherein the polyfunctional compound having at least two allyl groups is selected from the group consisting of diallyl terephthalate, diallyl adipate, triallyl cyanurate, triallyl

TABLE 5

|  | No. | Initial stage | | After 1 week | | After 1 month | |
| --- | --- | --- | --- | --- | --- | --- | --- |
|  |  | Peel strength (g/20 mm) | Residual adhesion ratio (%) | Peel strength (g/20 mm) | Residual adhesion ratio (%) | Peel strength (g/20 mm) | Residual adhesion ratio (%) |
| Examples | 19 | 5 | 92 | 7 | 90 | 10 | 90 |
|  | 20 | 40 | 80 | 125 | 75 | 122 | 75 |
|  | 21 | 55 | 78 | 200 | 65 | 230 | 63 |
|  | 22 | 25 | 60 | 55 | 51 | 55 | 52 |
|  | 23 | 32 | 81 | 293 | 51 | 353 | 50 |
|  | 24 | 85 | 75 | 252 | 52 | 450 | 40 |
|  | 25 | 255 | 52 | 503 | 41 | 653 | 35 |
|  | 26 | 153 | 70 | 495 | 40 | 559 | 38 |
|  | 27 | 105 | 73 | 255 | 58 | 359 | 50 |
|  | 28 | 285 | 50 | 383 | 45 | 498 | 40 |
| Comparative Examples | 13 | 325 | 35 | 538 | 30 | 652 | 28 | isocyanurate, pentaerythritol triallyl ether, glycerol diallyl ether, trimethylolpropane diallyl ether, diglycerol diallyl ether, diglycerol triallyl ether, allyl methacrylate, diallyl phthalate, diallyl maleate, diallyl isophthalate, triallyl trimellitate, tetraallyl pyromellitate, allyl glycol acrylate and allyl glycol methacrylate.

13. The process according to claim 1, wherein the polyfunctional compound has at least two methacryloyl groups.

14. The process according to claim 13, wherein the polyfunctional compound having at least two methacryloyl groups is selected from the group consisting of polyethylene glycol dimethacrylate, trimethylolpropane trimethacrylate, tetramethylolmethane tetramethacrylate, ethylene glycol dimethacrylate, diethylene glycol dimethacrylate, triethylene glycol dimethacrylate, neopentyl glycol dimethacrylate, 1,3-butylene glycol dimethacrylate, 1,6-hexanediol dimethacrylate, 1,4-butanediol dimethacrylate, pentaerythritol trimethacrylate, pentaerythritol tetramethacrylate, dipentaerythritol (monohydroxy)pentamethacrylate and dipentaerythritol hexamethacrylate.

15. The process according to claim 1, wherein the polyfunctional compound has at least two thiol groups.

16. The process according to claim 15, wherein the polyfunctional compound having at least two thiol groups is selected from the group consisting of trimethylolpropane tris-3-mercaptopropionate, 1,11-undecanedithiol, 4-ethylbenzene-1,3-dithiol, 1,8-octanedithiol, 1,18-octadecane dithiol, 4,8-dithioundecane-1,11-dithiol, dithiopentaerythritol, 1,2-dimercapto-1,3-butanediol, 2,6-dimethyloctane-2,6-dithiol, 2,4-dimethylbenzene-1,3-dithiol, 4,5-dimethylbenzene-1,3-dithiol, 1,10-decanedithiol, 1,12-dodecanedithiol, 2,5-toluenedithiol, 3,4-toluenedithiol, 1,6-hexanedithiol, 1,7-heptanedithiol, 1,4-benzenedithiol, 1,2-benzenedithiol, ethylene glycol dithioglycolate, 1,2,3-propanetrithiol, 1,2,4-butanetrithiol, trimethylolpropane trithioglycolate, pentaerythritol trithioglycolate, 1,3,5-benzenetrithiol, 2,4,6-mesitylenetrithiol, neopentane tetrathiol and pentaerythritol tetrakis(3-mercaptopropionate).

17. The process according to claim 1, wherein the polyfunctional compound is selected from the group consisting of trimethylolpropane trimethacrylate, tetramethylolmethane tetramethacrylate, triallyl cyanurate and triallyl isocyanurate.

18. The process according to claim 1, wherein said polyolefin resin is polyethylene, said dimethylpolysiloxane is trimethylsilyl terminated dimethylpolysiloxane, and said polyfunctional compound is triallyl isocyanurate.

19. The process according to claim 1, wherein the composition is melt-extruded onto a paper substrate to form the laminated film.

* * * * *